United States Patent
Zou

(10) Patent No.: US 11,004,602 B2
(45) Date of Patent: May 11, 2021

(54) MANUFACTURING METHOD OF FLAT COIL AND ELECTRONIC APPARATUS

(71) Applicant: Goertek Inc., Shandong (CN)

(72) Inventor: Quanbo Zou, Shandong (CN)

(73) Assignee: Goertek Inc., Weifang (CN)

( * ) Notice: Subject to any disclaimer, the term of this patent is extended or adjusted under 35 U.S.C. 154(b) by 592 days.

(21) Appl. No.: 15/739,950

(22) PCT Filed: Oct. 18, 2017

(86) PCT No.: PCT/CN2017/106720
§ 371 (c)(1),
(2) Date: Dec. 26, 2017

(87) PCT Pub. No.: WO2019/075668
PCT Pub. Date: Apr. 25, 2019

(65) Prior Publication Data
US 2019/0115151 A1    Apr. 18, 2019

(51) Int. Cl.
| | | |
|---|---|---|
| *H01F 41/074* | (2016.01) | |
| *H01F 41/04* | (2006.01) | |
| *H01F 5/00* | (2006.01) | |
| *H02J 50/10* | (2016.01) | |
| *H01F 27/28* | (2006.01) | |

(52) U.S. Cl.
CPC ........... *H01F 41/074* (2016.01); *H01F 5/003* (2013.01); *H01F 27/2847* (2013.01); *H01F 27/2871* (2013.01); *H01F 41/04* (2013.01); *H01F 41/045* (2013.01); *H01F 41/047* (2013.01); *H02J 50/10* (2016.02); *H01F 2027/2857* (2013.01); *Y10T 29/49073* (2015.01); *Y10T 29/49108* (2015.01)

(58) Field of Classification Search
CPC . Y10T 29/49073; H01F 41/04; H01F 41/047; H01F 41/074; H01F 6/06; H01F 5/003; H01F 27/2847; H01F 27/2871; H01F 2027/2857; H02J 50/005; H02J 50/10
See application file for complete search history.

(56) References Cited

U.S. PATENT DOCUMENTS

| | | | | |
|---|---|---|---|---|
| 3,421,207 A | * | 1/1969 | Berghout | H01F 6/06 29/599 |
| 4,709,472 A | * | 12/1987 | Machida | Y10T 29/49108 242/444.1 |
| 4,819,322 A | * | 4/1989 | Higuchi | H01F 41/04 29/605 |
| 4,937,226 A | * | 6/1990 | Nishiguchi | H01F 41/047 505/413 |
| 5,345,670 A | * | 9/1994 | Pitzele | Y10T 29/49073 264/272.19 |

FOREIGN PATENT DOCUMENTS

JP        2002203712 A   *   7/2002

* cited by examiner

*Primary Examiner* — A. Dexter Tugbang
(74) *Attorney, Agent, or Firm* — Alston & Bird LLP

(57) ABSTRACT

A flat coil, a manufacturing method thereof and an electronic apparatus are disclosed. The manufacturing method comprises: rolling a metal foil lamination onto a carrier roller to form a foil rod, wherein the metal foil lamination includes at least one layer of metal foil; sliding the foil rod from the carrier roller; slicing the foil rod into thin disks; and processing the thin disks to form at least one flat coil, wherein a pressing roller is pressed against the carrier roller via the metal foil lamination with a controlled pressing force as the metal foil lamination is rolled.

17 Claims, 4 Drawing Sheets

MANUFACTURING METHOD OF FLAT COIL AND ELECTRONIC APPARATUS

CROSS-REFERENCE TO RELATED APPLICATIONS

This application is a National Stage Application, filed under 35 U.S.C. § 371, of International Application No. PCT/CN2017/106720, filed on Oct. 18, 2017, the contents of which are hereby incorporated by reference in its entirety.

BACKGROUND

Related Field

The present invention relates to the technical field of forming coil, more specifically, to a method for manufacturing a flat coil, a flat coil and an electronic apparatus.

Description of Related Art

Recently, wireless charging applications become more and more attractive. Some of the leading smart phone suppliers have adopted wireless charging units in their smart phones. Other electronic apparatus such as wearable apparatus, handheld apparatus, computers and so on are also starting to adopt wireless charging unit. Generally, a wireless charging unit includes at least one flat coil. It is desired that the flat coil has a high quality and/or efficiency, at reasonably low cost.

In the prior art, there are two approaches for manufacturing a flat coil.

One approach is a Cu wire winding approach. FIG. 1 shows a Cu wire coil. As shown in FIG. 1, a flat coil 12 is formed by wingding a Cu wire. The flat coil 12 is placed on a ferrite sheet 14 via an adhesive tape 13. A magnet core 11 is provided to the flat coil 12. Since the flat coil is formed by winding a Cu wire, its through-put is relatively low and its cost is relatively high. Besides, the shape and diameters of the Cu wire are limited. So, it is difficult to perform a design optimization.

The other approach is to form a flat coil on a printed circuit board, for example, by lithography, Cu etching or plating on a PCB (Printed Circuitry Board), FPCB (Flexible Printed Circuitry Board) or ceramic substrates. FIG. 2 shows a schematic diagram of a flat coil in a PCB. As shown in FIG. 2, a coil array 22 is formed between an interface surface 21 and a shielding layer 23. This approach may suffer manufacturing cost issue. Furthermore, the flat coil manufactured by this approach typically has a degraded performance. For example, it has a high resistance, a low Quality-factor and a low efficiency.

Therefore, there is a demand in the art that a new solution for manufacturing a flat coil shall be proposed to address at least one of the problems in the prior art.

BRIEF SUMMARY

One object of this invention is to provide a new technical solution for a flat coil.

According to a first aspect of the present invention, there is provided a method for manufacturing a flat coil, comprising: rolling a metal foil lamination onto a carrier roller to form a foil rod, wherein the metal foil lamination includes at least one layer of metal foil; sliding the foil rod from the carrier roller; slicing the foil rod into thin disks; and processing the thin disks to form at least one flat coil.

Alternatively or optionally, the carrier roller has a starting slit, and one end of the metal foil lamination is inserted and fixed in the starting slit.

Alternatively or optionally, a pressing roller is pressed against the carrier roller via the metal foil lamination with a controlled pressing force during the metal foil lamination is rolled.

Alternatively or optionally, the metal foil lamination includes at least two layers of metal foils.

Alternatively or optionally, processing the thin disks further comprises: grinding the thin disks to a preset thickness; coating the thin disks with a passivation layer; and forming terminals of the thin disks.

Alternatively or optionally, the metal foil is a Cu foil.

Alternatively or optionally, the foil rod is sliced by using at least one of blade dicing, wire cutting and wire electrical discharging machining.

Alternatively or optionally, the metal foil contains an insulation layer with adhesive.

According to a second aspect of the present invention, there is provided a flat coil manufactured by using the method for manufacturing a flat coil according to any of the embodiments of this disclosure.

According to a third aspect of the present invention, there is provided a n electronic apparatus comprising a wireless charging unit which includes at least one flat coil according to any of the embodiments of this disclosure.

According to an embodiment of this disclosure, a new solution for manufacturing a flat coil is proposed. It may lower the manufacturing cost and/or provide a relatively high performance.

Further features of the present invention and advantages thereof will become apparent from the following detailed description of exemplary embodiments according to the present invention with reference to the attached drawings.

BRIEF DESCRIPTION OF THE FIGURES

The accompanying drawings, which are incorporated in and constitute a part of the specification, illustrate embodiments of the invention and, together with the description thereof, serve to explain the principles of the invention.

DETAILED DESCRIPTION OF VARIOUS EMBODIMENTS

Figure 1:
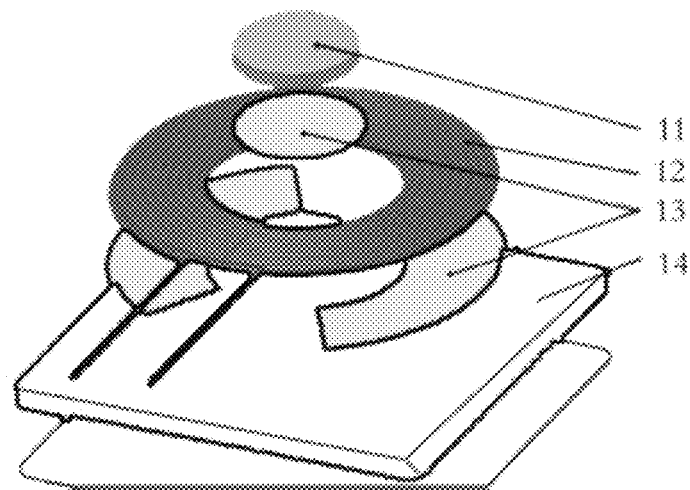
FIG. 1 is a schematic diagram of a flat coil manufactured by a prior art approach.
Figure 2:
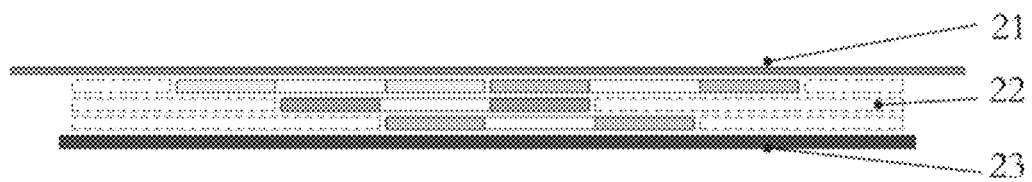
FIG. 2 is a schematic diagram of a flat coil manufactured by another prior art approach.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

Embodiments and examples will be described with reference to the figures.

The embodiments of this disclosure propose a new approach of manufacturing a flat coil, which is different from the prior art. In the embodiments, metal foils are used to manufacturing a flat coil. Compared with the prior art, this approach is more easy and/or cost-efficient.

FIG. 3-8 show a schematic diagram of a process of manufacturing a flat coil according to an embodiment of this disclosure.

Figure 3:
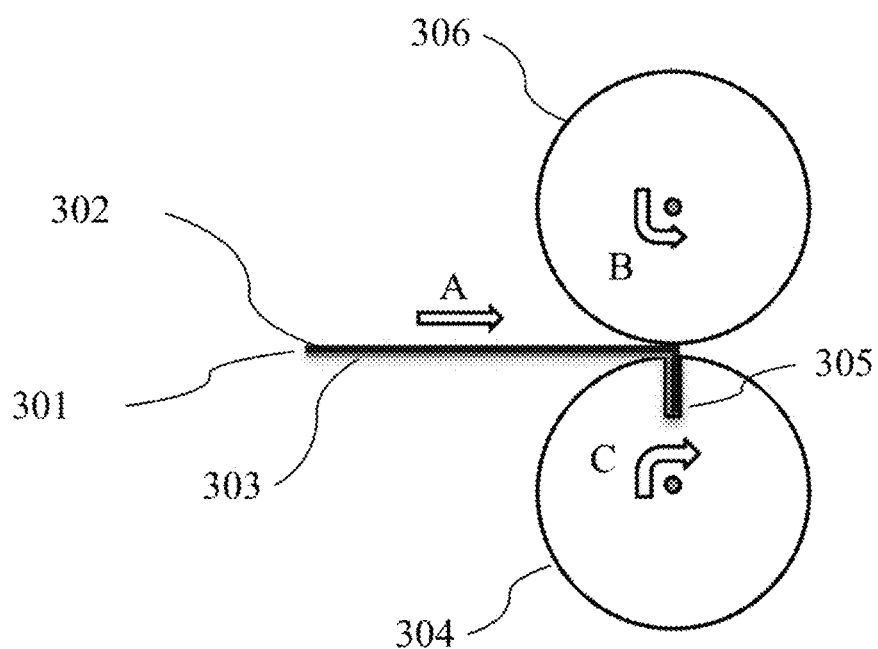
FIG. 3-8 show a schematic diagram of a process of manufacturing a flat coil according to an embodiment of this disclosure.

FIG. 3 shows that a metal foil lamination 301 is rolled onto a carrier roller 304 to form a foil rod.

Figure 9:
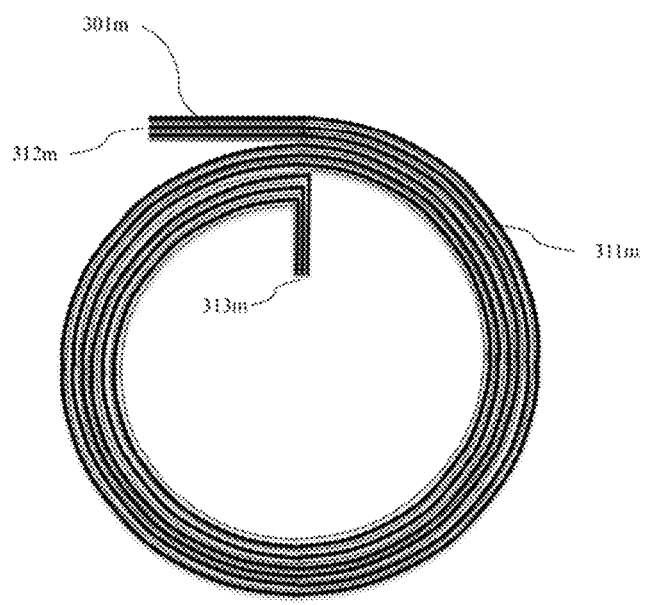
FIG. 9 shows a schematic diagram of a flat coil manufactured according to another embodiment of this disclosure.

The metal foil lamination 301 includes at least one layer of metal foil 302. For example, the metal foil is a Cu foil 302. FIG. 9 shows a metal foil lamination 301m, which includes at least two layers of metal foils. For example, the metal foil 302 contains an insulation layer 303 with adhesive.

As shown in FIG. 3, the carrier roller 304 has a starting slit 305, and one end of the metal foil lamination 301 is inserted and fixed in the starting slit 305.

Here, the carrier roller 304 may not be round, and may have a cross-section of other shape. This approach may provide a designer with more freedom of design.

Also as shown in FIG. 3, a pressing roller 306 is pressed against the carrier roller 304 via the metal foil lamination 301 with a controlled pressing force during the metal foil lamination 301 is rolled. During the rolling, the metal foil lamination 301 travels in the direction A, the carrier roller 304 rotates in the direction C, and the pressing roller 306 rotates in the direction B, as shown in FIG. 3.

Figure 4:
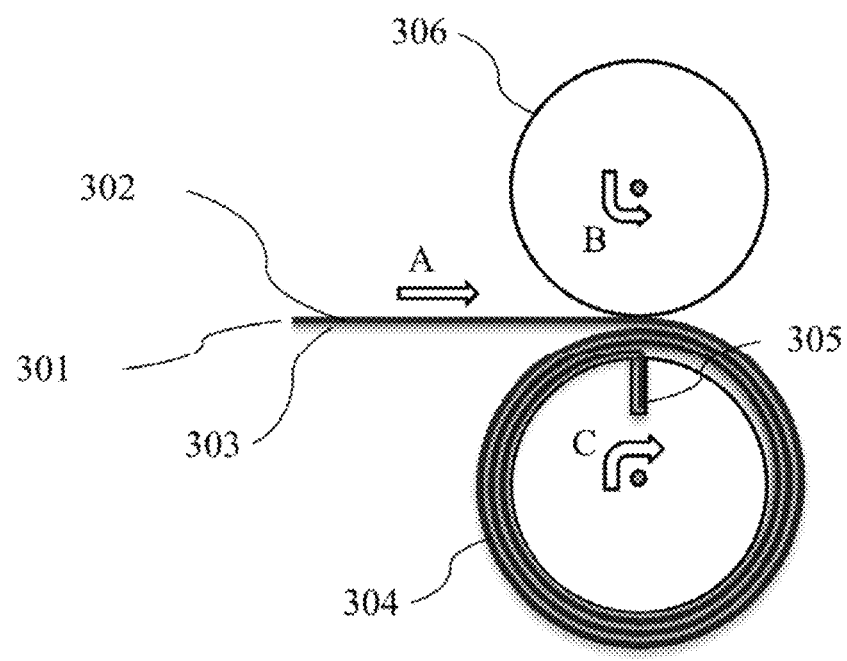

As shown in FIG. 4, the metal foil lamination 301 is rolled into a foil rod.

Figure 5:
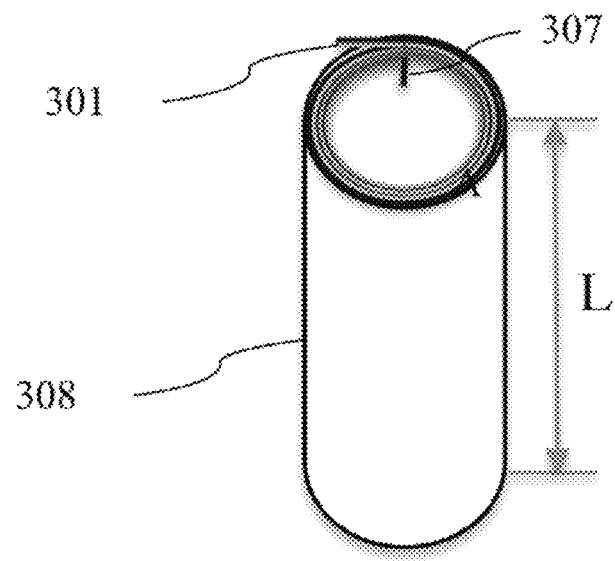

As shown in FIG. 5, the foil rod 308 is slid from the carrier roller 304. For example, the length of the foil rod 308 is L, which is much larger than the length of a single flat coil. The foil rod 308 can be used to make multiple flat coils. The end 307 of the metal foil lamination 301 is one inserted in the starting slit 305, as shown in FIGS. 3 and 4.

Figure 6:
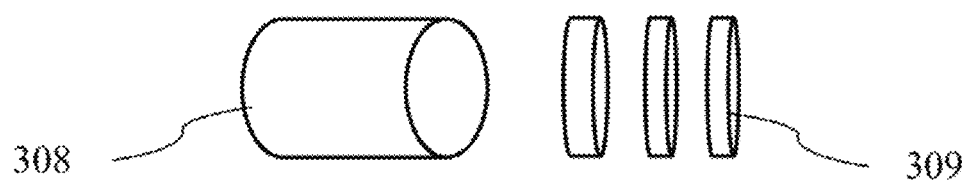

As shown in FIG. 6, the foil rod 308 is sliced into thin disks 309. The thin disk 309 is annular, for example. The thickness of a sliced thin disk may be from 100 μm to 1000 μm, for example.

For example, the foil rod 308 is sliced by using at least one of blade dicing, wire cutting and wire electrical discharging machining.

Next, the thin disks 309 are processed to form at least one flat coil. Under the teaching of this disclosure, a person skilled in the art can conceive a lot processes for the thin disks 309.

Figure 7:
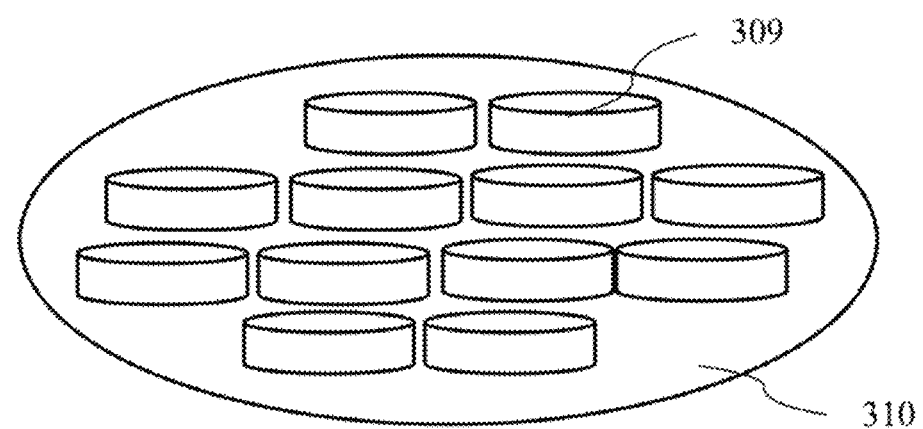

For example, the sliced thin disks 309 may be placed on a large platform for processing, as shown in FIG. 7. The processing may include: grinding the thin disks to a preset thickness; coating the thin disks with a passivation layer; and forming terminals of the thin disks.

For example, the thickness of a grinded thin disk may be from 50 μm to 900 μm and the passivation layer on the grinded surfaces of the flat coil (such as a Cu coil) is 5-25 μm. For example, the passivation layer can be polymer, plastic, epoxy, resist, adhesive and/or glue.

Figure 8:
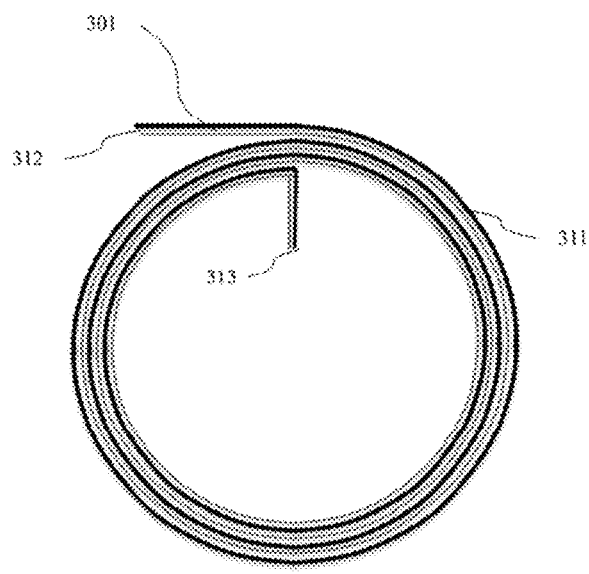

FIG. 8 shows a finished flat coil 311. The flat coil 311 is manufactured from the metal foil lamination 301. The flat coil 311 has a first terminal 312 and a second terminal 313. For example, the terminals 312, 313 may be formed by laser trimming or lithography patterning.

FIG. 9 shows a schematic diagram of a flat coil 311m manufactured according to another embodiment of this disclosure. The flat coil 311m is manufactured from the metal foil lamination 301m, which has at least two layers of metal foils. The flat coil 311m has a first terminal 312m and a second terminal 313m.

According to another embodiment of this disclosure, a flat coil manufactured by using the method for manufacturing a flat coil according to any of the above embodiments may also be provided. The flat coil may be used in a wireless charging unit of an electronic apparatus. For example, the flat coil may be used to replace the flat coil 12 in FIG. 1.

According to still another embodiment of this disclosure, an electronic apparatus is provided. The electronic apparatus comprises a wireless charging unit, and the wireless charging unit includes at least one flat coil according to according to any of the above embodiments. The electronic apparatus may be smart phone, an electronic tooth-brush, and so on.

Although some specific embodiments of the present invention have been demonstrated in detail with examples, it should be understood by a person skilled in the art that the above examples are only intended to be illustrative but not to limit the scope of the present invention.

What is claimed is:

1. A method for manufacturing a flat coil, the method comprising:
   rolling a metal foil lamination onto a carrier roller to form a foil rod;
   sliding the foil rod from the carrier roller;
   slicing the foil rod into thin disks; and
   processing the thin disks to form at least one flat coil, wherein:
   the metal foil lamination includes at least one layer of metal foil, and
   a pressing roller is pressed against the carrier roller via the metal foil lamination with a controlled pressing force as the metal foil lamination is rolled.

2. The method according to claim 1, wherein the carrier roller has a starting slit, and one end of the metal foil lamination is inserted and fixed in the starting slit.

3. The method according to claim 1, wherein the metal foil lamination includes at least two layers of metal foils.

4. The method according to claim 1, wherein processing the thin disks further comprises:
   grinding the thin disks to a preset thickness;
   coating the thin disks with a passivation layer; and
   forming terminals of the thin disks.

5. The method according to claim 1, wherein the metal foil is a Cu foil.

6. The method according to claim 1, wherein the foil rod is sliced by using at least one of blade dicing, wire cutting, and wire electrical discharging machining.

7. The method according to claim 1, wherein the metal foil contains an insulation layer with adhesive.

8. A method for manufacturing a flat coil, the method comprising:

rolling a metal foil lamination onto a carrier roller to form a foil rod;
sliding the foil rod from the carrier roller;
slicing the foil rod into thin disks; and
processing the thin disks to form at least one flat coil, wherein:
    the metal foil lamination includes at least one layer of metal foil, and
    processing the thin disks further comprises:
        grinding the thin disks to a preset thickness;
        coating the thin disks with a passivation layer; and
        forming terminals of the thin disks.

9. The method according to claim 8, wherein the carrier roller has a starting slit, and one end of the metal foil lamination is inserted and fixed in the starting slit.

10. The method according to claim 8, wherein the metal foil lamination includes at least two layers of metal foils.

11. The method according to claim 8, wherein the metal foil is a Cu foil.

12. The method according to claim 8, wherein either:
the foil rod is sliced by using at least one of blade dicing, wire cutting, and wire electrical discharging machining; or
the metal foil contains an insulation layer with adhesive.

13. A method for manufacturing a flat coil, the method comprising:
rolling a metal foil lamination onto a carrier roller to form a foil rod;
sliding the foil rod from the carrier roller;
slicing the foil rod into thin disks; and
processing the thin disks to form at least one flat coil, wherein:
    the metal foil lamination includes at least one layer of metal foil, and
    the metal foil contains an insulation layer with adhesive.

14. The method according to claim 13, wherein the carrier roller has a starting slit, and one end of the metal foil lamination is inserted and fixed in the starting slit.

15. The method according to claim 13, wherein the metal foil lamination includes at least two layers of metal foils.

16. The method according to claim 13, wherein processing the thin disks further comprises:
grinding the thin disks to a preset thickness;
coating the thin disks with a passivation layer; and
forming terminals of the thin disks.

17. The method according to claim 13, wherein either:
the metal foil is a Cu foil; or
the foil rod is sliced by using at least one of blade dicing, wire cutting, and wire electrical discharging machining.

* * * * *